United States Patent [19]

Dunne et al.

[11] 4,447,697
[45] May 8, 1984

[54] WELD GUN REPOSITIONING SYSTEM FOR PROGRAMMABLE MANIPULATOR

[75] Inventors: Maurice J. Dunne, Newtown; Klaus W. Nielsen, Brookfield Center, both of Conn.

[73] Assignee: Unimation, Inc., Danbury, Conn.

[21] Appl. No.: 471,304

[22] Filed: Mar. 2, 1983

Related U.S. Application Data

[63] Continuation of Ser. No. 891,000, Mar. 28, 1978, abandoned.

[51] Int. Cl.³ ............................................. B23K 11/10
[52] U.S. Cl. .................................. 219/86.41; 318/561; 318/568; 414/5
[58] Field of Search ..................... 219/80, 86.25, 86.41; 318/568, 561; 414/5, 1; 73/37.5

[56] References Cited

U.S. PATENT DOCUMENTS

| | | | |
|---|---|---|---|
| 2,692,498 | 10/1954 | Knobel | 73/37.5 |
| 3,605,909 | 9/1971 | Lemelson | 318/561 |
| 3,610,024 | 10/1971 | Honjo et al. | 73/37.5 |
| 3,665,148 | 5/1972 | Yasenchack et al. | 219/80 |
| 3,744,032 | 7/1973 | Engelberger et al. | 219/80 |
| 4,001,556 | 1/1977 | Folchi et al. | 414/5 |
| 4,011,437 | 3/1977 | Hohn | 318/568 |
| 4,140,953 | 2/1979 | Dunne | 318/568 |

OTHER PUBLICATIONS

K. Kuno et al., "Adaptive Positioning of Spot Welding Gun by Tactile Sensors", *Robot*, No. 12, 9/1976.

*Primary Examiner*—C. C. Shaw
*Attorney, Agent, or Firm*—Mason, Kolehmainen, Rathburn & Wyss

[57] ABSTRACT

A weld gun mounted on the end of the manipulator arm of a programmable manipulator is repositioned with respect to the initially taught path in accordance with variations in the dimensions of successive workpieces on which a series of spot welds are to be made.

A sensing means carried by the weld gun is employed to measure the position of the welding tips relative to the edge of the flanges which are to be welded. The output of this sensing means is employed to reposition the weld gun prior to the next weld. Repositioning may be accomplished by moving the weld gun bodily with respect to the end of the manipulator arm while the manipulator arm remains stationary at the taught position, or by modifying the command signal for the appropriate axis so that the manipulator arm is itself moved to a different position than the initially taught position.

33 Claims, 10 Drawing Figures

WELD GUN REPOSITIONING SYSTEM FOR PROGRAMMABLE MANIPULATOR

This is a continuation of application Ser. No. 891,000 filed Mar. 28, 1978, now abandoned.

The present invention relates to programmable manipulators, and, more particularly, to programmable manipulators of the type which are employed in conjunction with a weld gun to perform spot welding operations on car bodies and the like.

There have been many arrangements heretofore proposed for performing spot welding operations by mounting a weld gun on the end of the manipulator arm of a programmable manipulator and programming the manipulator so that the weld gun performs a series of spot welds on a car body as it is moved past the spot welding station. One such arrangement is shown, for example, in Engelberger et al U.S. Pat. No. 3,744,032 which is assigned to the same assignee as the present invention. In such arrangements the sheet metal pieces which are to form the car body are first loosely connected together by means of bent-over tabs and a few spot welds are made to hold the pieces together. Then many hundreds of spot welds are made on the flanged edges of the sheet metal pieces to form a rigid unitary car body, this latter operation being normally referred to as a re-spot welding operation. Since the flanges on which the spot welds are made during a re-spot operation are relatively narrow, being customarily about ⅝ inch wide, it is desirable to maintain the position of the spot weld in approximately the middle of the flange portion of the sheet metal pieces which form the car body. If the spot weld is too near the outside edge of the flanges a weak weld results and in some instances when no metal is present between a portion of the welding tips, molten metal and sparks may cause damage to surrounding equipment or injury attending personnel. If the spot weld is too far in on the flange, i.e. too close to adjacent surfaces of the sheet metal pieces, so-called blooming may result which produces strain marks which must be smoothed by filling with lead, or some other expedient.

While the programmable manipulator is initially taught to move the welding tips along a line which is in the middle of the flange portions of a representative car body, due to the fact that there are slight dimensional difference in the sheet metal pieces which are initially tacked together, and also the fact that it is impossible to form sheet metal so that all parts are exactly alike, it has been found that as different car bodies are welded the line along which the manipulator has been programmed to make a series of spot welds may not be coincident with the middle of the flange of a particular car body so that some of the welds are either placed too close to the edge of the flange pieces or else too far in on the flange so that the adjacent surfaces of the body are damaged.

With present day apparatus this condition is simply accepted since it is not feasible to reprogram the manipulator for each car body when car bodies are being spot welded on a mass production basis.

While various prior art manipulator arrangements have employed a sensor in conjunction with the programmable manipulator arm these arrangements have not employed the output of the sensor to control modification of the taught path as the manipulator arm is being moved over the path. For example, in Lemelson U.S. Pat. No. Re. 26,904 a sensing relay is mounted on the end of the manipulator arm which is employed to sense the presence of an article gripped by the jaws of the manipulator, the output of the sensing relay being employed simply to start the programmed tape so that the manipulator arm is thereafter moved over the taught path. A similar arrangement is shown in Devol U.S. Pat. No. 3,251,483 wherein a sensor in the hydraulic line to the jaws is employed to determine when an article has been seized.

In Devol U.S. Pat. No. 3,525,382 a sensor mounted on the end of the manipulator arm is employed to detect whether a casting has been left in the cavity during a die casting operation, the output of the sensor being employed either to turn on an alarm or stop the machine.

In Devol U.S. Pat. No. 3,305,442 the selection of different programs is controlled by the size of each article which is handled, the size of the article being determined by gaging or calipering means on one of the gripping members on the end of the manipulator arm. A similar arrangement is employed in Rackman et al U.S. Pat. No. 3,850,313 wherein an article calipering device is employed to measure the size of an article which is to be palletized.

In Engelberger et al U.S. Pat. No. 3,885,295 two randomly oriented parts may be interfitted by first moving the manipulator arm to a point where the parts are in approximate alignment and then moving the arm in a spiral search pattern while urging the parts together so that they become interfitted.

None of these prior art arrangements propose to employ the output of the sensor to monitor the position of a weld gun relative to the workpiece and means controlled by the output of the sensor for modifying the taught path of the manipulator arm so that compensation is provided for dimensional differences from one workpiece to another.

It is, therefore, an object of the present invention to provide a new and improved programmable manipulator arrangement wherein one or more of the above described disadvantages of prior art arrangements are avoided.

It is another object of the present invention to provide a new and improved programmable manipulator for performing a series of spot welding operations on car bodies wherein the taught path of the weld gun is modified as the arm is moved from one spot weld to another so that the weld gun is maintained in fixed relationship to the edge of the flanges of the pieces to be welded.

It is a further object of the present invention to provide a new and improved programmable manipulator for performing a series of spot welds on flanged car bodies wherein a sensing arrangement is employed to determine the position of the welding tips relative to the edge of the flange being welded as the arm is moved over the taught path, and means are provided for modifying the taught path in accordance with the output of the sensing means to maintain the welding tips in a predetermined relationship to the edge of the flange.

It is another object of the present invention to provide a new and improved programmable manipulator for performing a series of spot welding operations wherein a crosshead is mounted on the End of the manipulator arm and the weld gun is in turn mounted on this crosshead, means being provided for repositioning the crosshead as the manipulator arm is moved from one spot welding position to the next so that the spot welds are maintained along the center line of the flange being welded despite variations in the dimensions of different car bodies.

It is a further object of the present invention to provide a new and improved programmable manipulator for performing a series of spot welding operations on a workpiece wherein an air gage is employed to determine the position of the welding tips relative to the flange to be welded and the air gage output signal is employed to reposition the welding tips so that they are maintained in fixed relationship to the edge of the flange as the series of spot welds is made on the car body.

It is a still further object of the present invention to provide a new and improved manipulator for performing a series of spot welding operations on a flanged workpiece wherein sensing means are employed to sense the position of the welding tips relative to the edge of the flange as the manipulator arm is moved over the taught path and facilities are provided for modifying the path of the manipulator arm so that the welding tips are maintained in fixed relationship to the edge of the flange as the spot welds are being made on the flange.

The invention, both as to its organization and method of operation, together with further objects and advantages thereof, will best be understood by reference to the following specification taken in connection with the accompanying drawings in which.

Figures 1, 2:
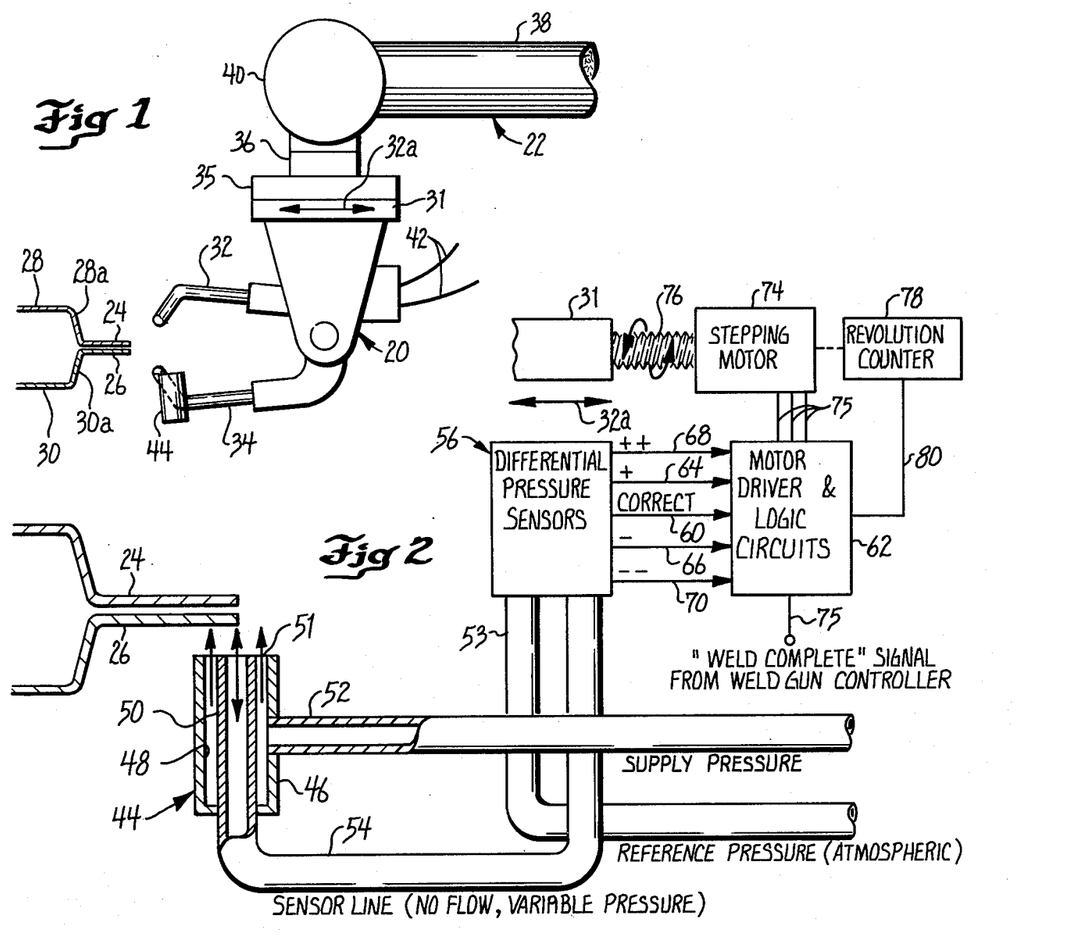
FIG. 1 is a diagrammatic illustration of a programmable manipulator arm incorporating the features of the present invention.
FIG. 2 is a block diagram illustrating the electrical circuit arrangement of the invention of FIG. 1.

Referring now to the drawings, and more particularly to the embodiment of FIGS. 1 to 8, inclusive, thereof, a weld gun indicated generally at 20 is mounted on the end of a manipulator arm indicated generally at 22. Only the outer end of the arm 22 is shown in FIG. 1 it being understood that this manipulator arm is movable in the rotary, down up and in out axes by means of any suitable arrangement, such as shown for example in Dunne et al U.S. Pat. No. 3,661,051. The programmable manipulator is initially programmed during a teaching operation to make a series of welds along the flange portions 24, 26 of the sheet metal members 28, 30, these members representing a portion of an automobile car body. In order to make this series of spot welds the manipulator is initially programmed by any suitable arrangement, for example any one of the teaching arrangements described in Engelberger et al U.S. Pat. No. 3,744,032, so that the jaws 32, 34 of the weld gun 20 are positioned on opposite sides of the flanges 24, 26 and these jaws close in response to a weld signal which is taught during the initial teaching operation. After the weld is completed the circuitry which controls the weld gun 20 (not shown) develops a weld complete signal in response to which the jaws 32, 34 are opened and the manipulator arm is moved along the flanges 24, 26, i.e. in a direction into the plane of the paper as shown in FIG. 1, to the position at which the next spot weld is to be made.

Due to the flact that the dimensions of individual car bodies may vary considerably due to manufacturing tolerances and also the fact that in relatively unsupported areas the flange portions 24, 26 may vary slightly from one car body to the next, it has been found that when the weld gun 20 is moved along the taught path to weld a series of car bodies, the actual spot welds may be improperly positioned on the flanges 24, 26. This is because the dimensions of successive car bodies may not agree exactly with the dimensions of the car body which was employed initially to teach the programmable manipulator to move over the taught path. As a result the spot weld may be placed either too close to the adjacent surfaces 28a, 30a of the sheet metal pieces 28, 30 or, may be too far toward the edge of the flanges 24, 26 so that a good weld is not made.

In accordance with the present invention an arrangement is provided for bodily moving the weld gun 20 in a direction perpendicular to the line along which the spot welds are made, movement of the weld gun in this direction being controlled by a sensing arrangement which is operative as a particular car body is being welded to corredt the position of the weld gun so that the spot welds are uniformly made in approximately the middle of the flanges 24, 26. More particularly, the weld gun 20 is mounted on a crosshead 31 which is slidable in the direction of the arrow 32a with respect to a mounting plate 35 which is secured to the wrist swivel joint 36 of the programmable manipulator arm 22. The wrist swivel output member 36 is secured to the ends of the in-out drive rods 38 through the wrist bend joint 40 by means of any suitable arrangement, as will be readily understood by those skilled in the art. It will also be understood that power for closing the welding tips 32, 34 of the gun 20 and supplying welding current thereto is provided through the flexible conductors 42, as will be readily understood by those skilled in the art.

In order to determine whether repositioning of the weld gun 20 relative to the taught path is required in connection with a particular car body, an air gage, which is indicated diagrammatically at 44 in FIG. 1, is mounted on the weld gun 20 and is positioned so that when the welding tips are properly positioned to make a spot weld in the middle of the flanges 24, 26 the air gage 44 is positioned beneath the flange 26 and is approximately centered along the outer edge of this flange. As best illustrated in FIG. 2, the air gage comprises a body member 46 having a central top opening recess 48 therein within which is positioned a sensing tube 50. Air is supplied to the opening 48 through an inlet line 52, this air being supplied at constant flow and constant pressure from any suitable source such as shop air at 20 psi available at the spot welding station. The inlet air issues through the annular orifice 51 formed between the sleeve 50 and the body 46 and strikes the underside of the flange 26. Depending upon the position of the air gage 44 relative to the edge of the flange 26, a variable pressure signal is developed in the sensing tube 50 which is supplied over the line 54 to a series of differential pressure sensors 56. If the air gage is properly centered with respect to the edge of the flange 26 the pressure in the line 54 is preferably designed to be equal to atmospheric pressure. The differential pressure sensors 56 compare the pressure in the line 54 with the pressure in a reference line 53 (preferably atmospheric pressure) and when the resultant pressure reaches certain predetermined limits provide either a positive or negative signal depending upon the deviation of the pressure in the line 54 from the reference pressure.

Figure 3:
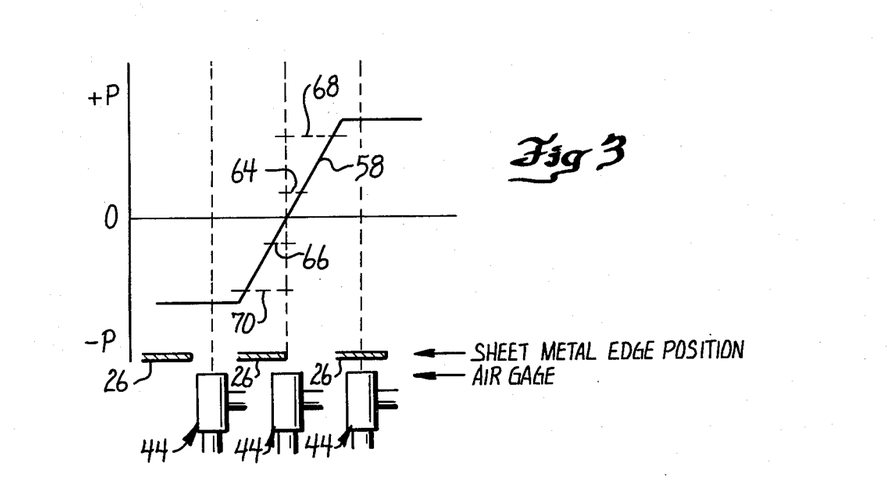
FIG. 3 is a diagram showing the operation of the pressure sensor employed in the arrangement of FIG. 1.

The differential pressure sensors 56 preferably comprise a pair of ultra low differential pressure switches which may be used to sense the pressure in the sensor line 54 relative to the pressure in the reference line 53. Preferably, these miniature differential pressure switches may each comprise a type PSF100A switch manufactured by Fairchild Industrial Products, a division of Fairchild Camera and Instrument Corporation, 75 Mall Drive, Commack, N.Y. A differential pressure switch of this type responds to very slight changes in pressure and has a rapid response time to differential changes in pressure. One of these differential pressure switches is set to provide an output on either the conductor 64 or the conductor 66 when the indicated differential pressure is reached in either the positive or negative direction. The other differential pressure switch provides the output on the conductors 68 and 70 when the larger differential pressure indicated in FIG. 3 has been countered. The air pressure in the sensor line 54 is arranged to have the characteristic shown at 58 in FIG. 3. Referring to this figure, it will be seen that when the air gage 44 is centered about the edge of the flange 26, a median pressure equal to atmospheric pressure and indicated as "0" in FIG. 3 is developed in the line 54. When the air gage is positioned fully beneath the flange 26 a maximum positive pressure is developed in the line 54 and when the air gage 44 is positioned entirely beyond the outer edge of the flange 26 a minimum pressure is developed, the pressure in the line 54 varying generally linearly between these values as the air gage 44 is moved off the central position indicated as "0" in FIG. 3. The differential pressure sensors 56 are arranged to provide either positive or negative correction signals depending upon the position of the air gage 44 relative to the flange 26. More particularly, when the air gage is positioned at the "0" position, a signal is supplied over the conductor 60 to the motor driver and logic circuit 62 indicating that the weld gun 20 does not need repositioning. A first one of the differential pressure sensors 56 is operative to supply a positive correction signal on the conductors 64 when the pressure in the sensor line 54 reaches the value indicated at 64 in FIG. 3 and similarly provides a negative signal on the minus conductor 66 when the pressure in the line 54 fails to the negative value 66. In a similar manner the second differential pressure sensor is set to provide a positive correction signal on the conductor 68 when the positive pressure in the line 54 reaches the higher level 68 and also develops a negative pressure correction signal on the conductor 70 when the pressure falls to the negative value 70 shown in FIG. 3.

While the air gage 44 is continuously operative to sense the presence of an obstruction adjacent to it, since the air gage is movable with the lower jaw 34 as it is opened and closed it is necessary to enable the logic circuits 62 only after the welding tips have arrived at the programmed point. Arrival of the welding tips at this programmed point is indicated by a total coincidence signal developed in all axes of the manipulator, as described in detail in U.S. Pat. No. 3,661,051, for example. However, this total coincidence signal is employed immediately thereafter to close the welding jaws on the flanges 24, 26 and there is not sufficient time to make a correction in the transverse position of these welding jaws as they close and before they make contact with the flanges 24, 26. Accordingly, in accordance with an important aspect of the present invention the logic circuits 62 are controlled in response to the weld complete signal which is developed at the time the welding jaws 32, 34 are opened immediately after the weld is completed. At this time the welding tips are positioned at the programmed point and if the position of these welding tips relative to the flange 26 is sensed at this particular instant the weld gun may be repositioned transversely while the welding jaws are opening and the weld gun is being moved to the next programmed location at which the next spot weld is to be made. To this end, the logic circuits 62 are controlled by means of the weld complete signal on the conductor 72. The logic circuits 62 include suitable latches for storing the signals on the output conductors 60-70 of the differential pressure sensors 56 at the time a weld complete signal is received. These signals are latched because at that time the sensor is in the correct measurement position, i.e. the welding tips 32,34 are closed and about to open.

When a weld complete signal is developed, a motor driver circuit is energized which controls a stepping motor 74 over the conductors 75. The stepping motor 74 drives a lead screw 76 rotation of which is effective to move the crosshead 31 relative to the platform 35 mounted on the end of the manipulator arm 22. Accordingly, as the manipulator arm 22 is moved to the next programmed point at which a spot weld is to be made, the welding tips are moved transversely to the end of the manipulator arm by a predetermined amount in the direction tending to correct the error previously sensed.

In accordance with a further aspect of the invention the weld gun 20 is repositioned by either a small or large increment after a given spot weld is made. If further adjustment of the weld gun 20 is needed, as determined by the air gage 44 and differential pressure sensors 56 when this next weld is completed, the weld gun is further repositioned as the manipulator arm 22 is moved to the next programmed location at which a spot weld is to be made. To this end, a revolution counter 78 is connected to the shaft of the stepping motor 74 and is arranged to supply control signals over the conductor 80 to the logic circuit 62. If, for example, a signal is developed on the plus conductor 64, the logic circuit 62 may be arranged to deenergize the motor after it has been rotated one revolution, the lead screw 76 having a pitch such that the crosshead 31 is moved 1.5 mm, for example, during this one revolution of the motor 74. The crosshead 31 would likewise be positioned by a similar increment of 1.5 mm in the opposite direction in response to a control signal on the minus conductor 66. When a large positive correction signal appears on the conductor 68 the motor 74 may be arranged to rotate two revolutions before the motor is de-energized so that the crosshead 31 is moved 3.0 mm in the direction to reposition the weld tips to the desired central location on the middle of the flange 26. A similar correction in the opposite direction would also be made when a large negative signal appears on the conductor 70. The welding tips are thus repositioned in a series of increments until the spot welds are being made at the correct depth on the flanges 24, 26.

The use of the air gage 44 to determine the relative position of the welding tips 32, 34 relative to the flanges to be welded, is desirable because this air gage may be made small and may be of rugged construction to withstand the harsh environment in the vicinity of the welding tips 32, 34 and reduce as much as possible the potential for damage to the sensor by heat, flying sparks and drops of molten metal. Furthermore, since air is continuously issuing out of the orifice 51 of the air gage 44 the gage is continuously cooled. Also, the issuance of air out of the annulus 51 tends to prevent it from becoming clogged during usage. Furthermore, the configuration of the air gage 44 lends itself to fabrication by powdered metallurgy or ceramic methods. In the alternative, the gage 44 may be made employing tungsten carbide or ceramic inserts in the exposed areas of the gage with the resultant toughness and heat resistant characteristics of such inserts.

While the usage of a pneumatic sensing arrangement, such as the above-described air gage 44, is desirable for the reasons discussed heretofore, it is also possible to employ an optical, infrared, or other type of sensing arrangement which can provide the necessary output signals to control the stepping motor 74 and reposition the welding tips to maintain the desired relationship with respect to the flanges 24, 26, as successive welds are made along the length thereof.

It should be noted that in the embodiment of FIGS. 1 to 8, repositioning of the weld gun 20, by means of the above-described control system for controlling movement of the crosshead 31, is entirely independent from the main program control by means of which the manipulator arm 22 is moved to the next programmed location at which a spot weld is to be made. Thus, after a weld has been completed, and a weld complete signal is supplied over the conductor 72, the next program step is read from memory and the manipulator arm 22 is moved to the programmed location in response to the corresponding command signals read from the memory, as discussed in detail in U.S. Pat. Nos. 3,661,051 and 3,744,032, referred to previously. At the same time, the crosshead 31 may or may not be repositioned relative to the location called for by the next program step, depending upon the output of the air gage 44 and differential pressure sensors 56.

In accordance with a further aspect of the present invention, a control arrangement is provided so that the crosshead 31 is positioned at approximately its midpoint of travel with respect to the mounting plate 35 at the start of each program cycle during which a series of successive spot welds on a particular car body are to be made. To this end, the end of program signal which is read from the memory of the programmable manipulator at the end of the last program step of the taught program, as described in detail in U.S. Pat. No. 3,661,051, is supplied over the conductor 82 to the logic circuit 62. A positive or negative feedback signal is also supplied over the conductor 84 to the logic circuits 62, this feedback signal providing an indication when the crosshead 31 is positioned at its midpoint, as will be described in more detail hereinafter. The logic circuits 62 function to energize the stepping motor 74 in response to the E/P signal on the conductor 82 so that the crosshead 31 is driven in the correct direction to position the crosshead 31 at its midpoint. During this movement of the crosshead 31, the logic circuits 62 are, of course, not responsive to the output of the differential pressure sensors 56.

Considering now the arrangement of the present invention whereby the weld gun 20 is mounted on the end of the manipulator arm 22 for movement in a direction transversely to the spot welding line, reference may be had to FIGS. 5 to 8 wherein one such suitable mounting arrangement is shown. Referring to these figures, the upper end of the weld gun 20 is secured to the bottom surface of the crosshead 31 by any suitable means (not shown) and the crosshead 31 is slidably mounted in the mounting plate 35 by means of the V-shaped ways 90. The stepping motor 74 is mounted on a bracket 92 which which is in turn supported from the mounting plate 35 by means of the screws 94. The driving motor 74 is employed to drive the screw 76 through the chain 96, the chain 96 interconnecting a gear 98 positioned on the stepping motor drive shaft 100 and a gear 102 positioned on the end portion 104 of the drive screw 76. The drive screw 76 is threaded through the crosshead 31 and is supported at either end from the platform 35 so that when the stepping motor 74 is energized the drive screw 76 is rotated and the crosshead 31 is moved relative to the mounting plate 35 which is secured to the end of the manipulator arm 22. Accordingly, energization of the stepping motor 74 may be employed to move the crosshead 31 and consequently the weld gun secured thereto so that the welding tips 32, 34 of the weld gun 20 may be moved along a line which is transverse to the edge of flanges 24, 26 which are being spot welded. Preferably, the crosshead 31 has a total range of travel of one inch in either direction from its midposition to accommodate relatively large variations in the repositioning of the weld gun 20 for varying conditions of the workpiece being welded.

As discussed generally heretofore, an open loop drive arrangement is employed for moving the crosshead 31 wherein the stepping motor 74 is rotated either one revolution in response to a relatively small differential pressure signal on the conductor 64 or 66 or is moved two turns each correction cycle in response to a signal on either of the large pressure differential conductors 68, 70. To this end, a disc 106 is mounted on the stepping motor shaft 100 on the opposite end from the gear 98 and a pair of optical sensors are mounted to measure rotation of the stepping motor shaft 100. More particularly, a pair of brackets 107, 108 are mounted on the mounting plate 35 and support the light sources 110 and the photocells 112, respectively. The disc 106 is provided with a single aperture so that a pulse is produced by the sensors 110, 112 each half revolution of the disc 106. These pulses are supplied over the conductor 80 to the logic circuits 62 wherein they are employed to deenergize the stepping motor 74 when it has been moved either one revolution in response to a low differential pressure error signal or two revolutions in response to a high differential pressure error signal.

Figure 8:
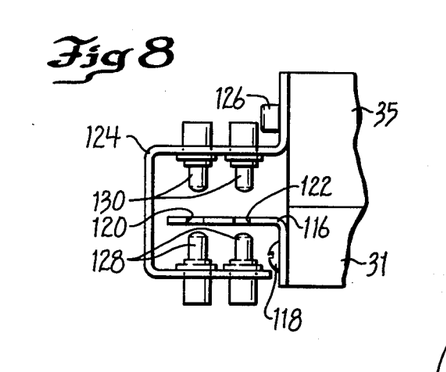
FIG. 8 is a sectional view taken along the lines 8—8 of FIG. 8.

As discussed generally heretofore, the crosshead 31 is arranged to be moved to its midposition at the start of each program cycle so that correction can be made in either direction depending upon the drift of the flanges relative to the programmed path. To this end, a bracket 116 is mounted on the crosshead 31 by means of the screws 118, the bracket being provided with offset slots 120 and 122 (FIG. 8). A U-shaped bracket 124 is mounted on the mounting plate 35 by means of the screws 126 and supports a pair of opposed light sources 128 and photodetectors 130. When the crosshead 31 is positioned at the midpoint of its travel relative to the plate 35 both of the light sources 128 are blocked by the bracket 116. However, when the crosshead 31 is positioned away from its midpoint either one or the other of the photosensing pairs 128, 130 is energized through the respective one of the slots 120, 122 so that a signal is provided indicating the direction in which the crosshead 31 must be moved to place it at its midpoint. When an end of program is provided on the conductor 82 at the end of the program cycle, the feedback signals derived from the sensing pairs 128, 130 are supplied over the conductors 84 to the logic circuit 62 and are employed to drive the stepping motor 74 in the correct direction until the feedback signal disappears when the midpoint of the crosshead 31 is reached.

Figures 4, 5:
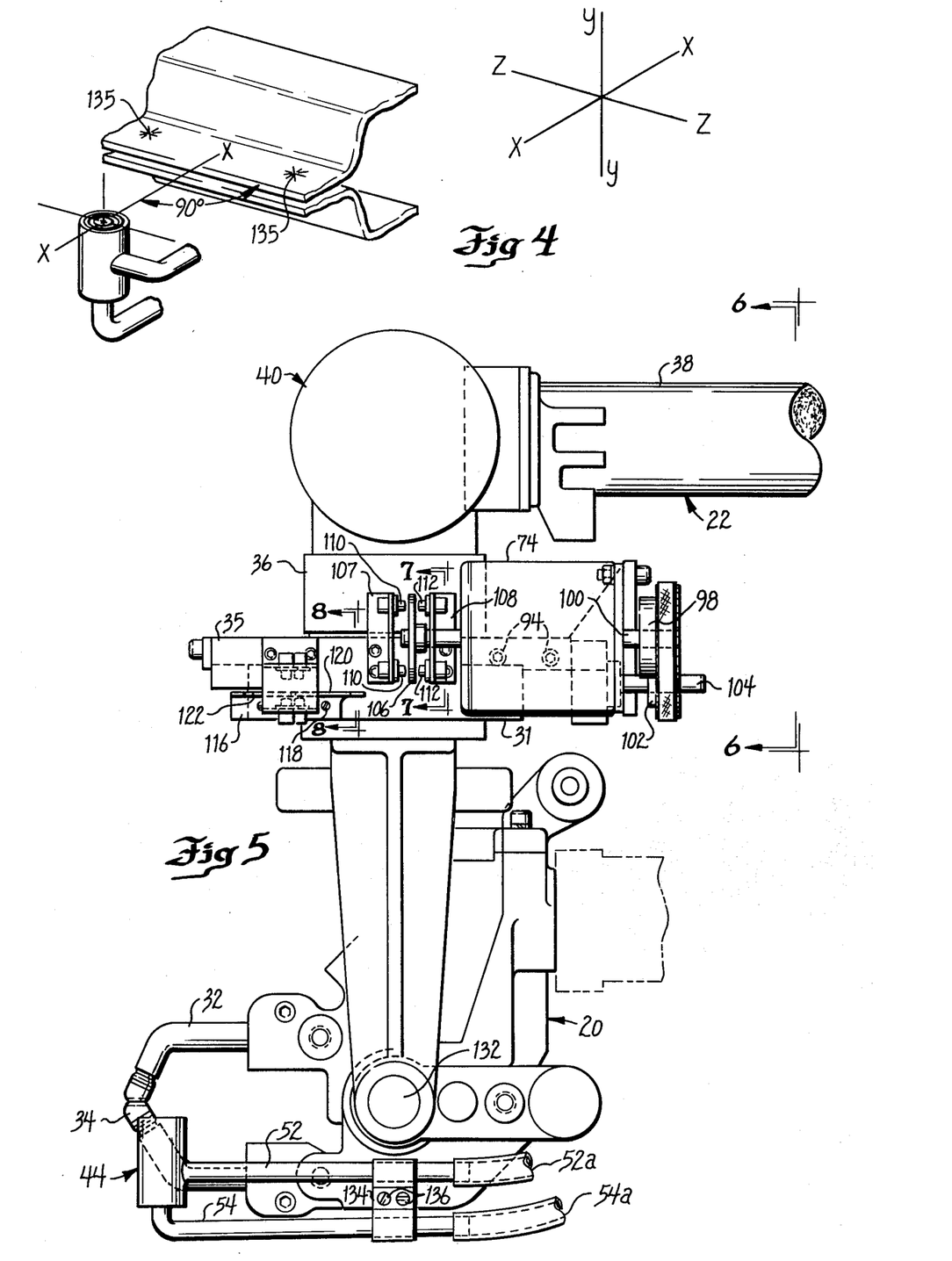
FIG. 4 is a fragmentary perspective view showing the operation of the pressure sensing arrangement of FIG. 1.
FIG. 5 is a detailed front elevational view of the outer end portion of the manipulator of FIG. 1.
Figure 6:
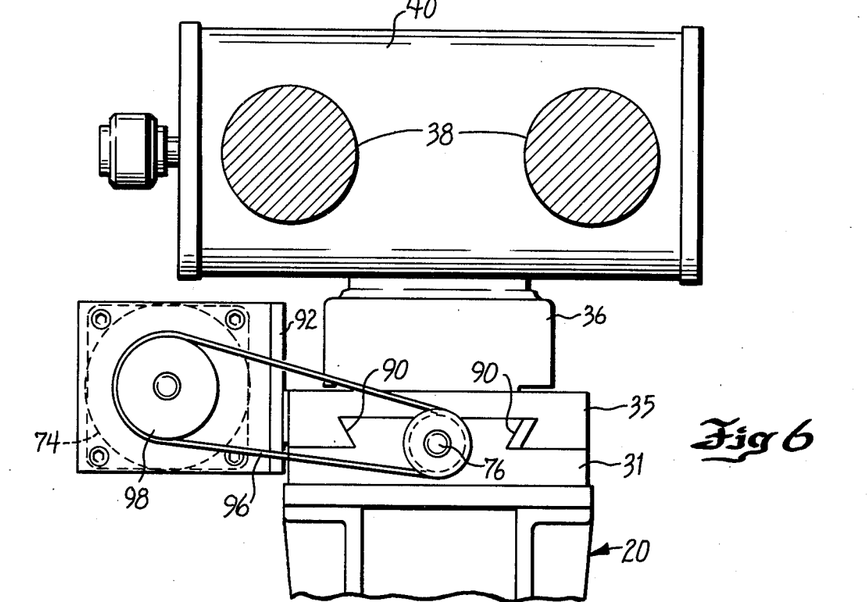
FIG. 6 is a right side view of the end portion shown in FIG. 5.
Figure 7:
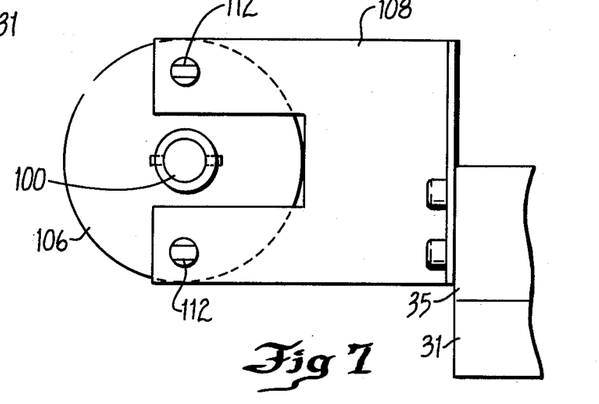
FIG. 7 is a sectional view taken along the lines 7—7 of FIG. 5.

Referring now to the manner in which the air gage 44 is mounted in relation to the welding tips 32, 34, the weld gun 20 shown in FIG. 5 is of the pinch type wherein each of the welding jaws 32, 34 is pivotable about the common center 132 to open the jaws after the weld has been made and to close these jaws on the sheet metal flanges prior to the making of the next spot weld. However, it will be understood that other types of weld guns which employ a C-type welding jaw arrangement wherein one jaw is fixed and the other is movable may equally well be employed insofar as the present invention is concerned.

In the illustrated embodiment, the air gage 44 is mounted on the pivotally mounted bottom jaw 34 by means of the bracket 134 which is secured to the jaw 34 by means of the screws 136. More particularly, the air supply tube 52 and sensor line 54, which may comprise rigid tubing, are clamped to the jaw 34 by means of the bracket 134 so that the air gage 44 occupies the position shown in FIG. 5 relative to the welding tips 32, the air gage 44 being displaced laterally relative to the plane of the welding jaws 32, 34 due to the fact that the tubes 52, 54 are mounted on the side of the jaw 34. When the welding tips 32, 34 are positioned at the midpoint of the flanges 24, 26 to be welded, the air gage 44 is centrally positioned with respect to the edge of these flanges so that a zero differential pressure output signal is provided by the differential pressure sensors 56, as shown in FIG. 3. In order to permit movement of the air gage 44 with the jaw 34 as this jaw is opened after the welding cycle is completed, the control lines 52, 54 are connected with their respective supply and sensing lines through the flexible tubes 52a, 54a, respectively. In this connection, it will be understood that any other suitable arrangement may be employed for mounting the air gage 44 in proximity to the welding tips 32, 34 and in such position that it may accurately measure the position of these tips relative to the edge of the flanges being welded, or some other predetermined portion of the workpiece which is to be welded.

In the embodiment of FIGS. 1 to 8, inclusive, the weld gun 20 may be positioned, during the initial teaching operation, so that the axis along which the crosshead 31 is moved is perpendicular to the edge of the flanges 24, 26 irrespective of the orientation of these flange edges. Thus, as shown in FIG. 4, if the edges of the flanges 24, 26 are aligned along a line identified as the Z axis in FIG. 4 and a series of spot welds are to be performed at a series of points indicated at 135 therein, which are arranged along a line parallel to the Z axis, the weld gun 20 may be positioned during the teaching operation so that the axis along which the crosshead 31 is moved is aligned parallel to the X axis shown in FIG. 4, i.e. perpendicular to the edges of the flanges 24, 26. Accordingly, whenever a correction is called for by the sensing air gage 44, the resultant movement of the crosshead 31 upon energization of the driving motor 74 is in the correct direction to reposition the welding tips 32, 34 to the middle of the flanges 24, 26.

Figure 9:
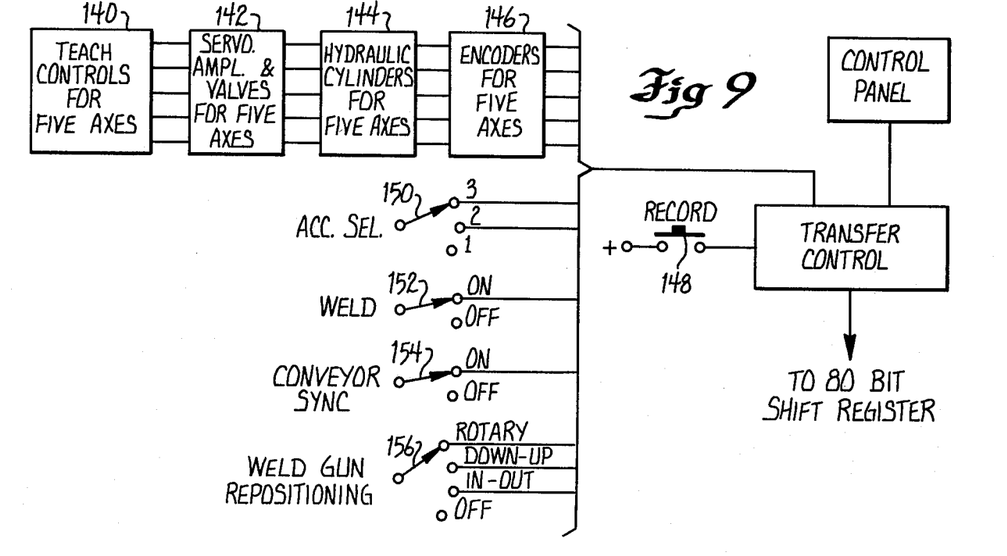
FIG. 9 is a block diagram of an alternative embodiment of the invention showing the arrangement employed during the teaching operation of the programmable manipulator.

Under some conditions it may be possible to perform a series of spot welds along a line which is oriented so that repositioning of the weld gun may be performed by moving one of the major axes of the programmable manipulator itself rather than by adjusting the position of the weld gun 20 relative to the end of the manipulator arm. Under these conditions the alternative embodiment of FIGS. 9 and 10 may be used. In this alternative embodiment the crosshead 31 and mounting plate 35 are eliminated and the weld gun is directly connected to the wrist swivel output member 36 on the end of the manipulator arm 22. If, for examle, a series of welds are to be performed along a line generally parallel to the in-out axis of the manipulator arm 22, i.e. along the direction of movement of the parallel rods 38, the weld gun may then be repositioned under the control of the sensing means 44 by modifying the command signal for the rotary axis whenever a correction is called for by the air gage 44. However, it is necessary for the operator to determine during the initial teaching operation which one of the three major axes of the manipulator is to be employed for repositioning of the weld gun and to store a suitable auxiliary control signal in memory during the teaching operation which can then be used during playback to initiate modification of the command signal only in the designated axis. To this end, a teaching arrangement such as shown in FIG. 9 is preferably employed during the teaching operation of this alternative embodiment of the present invention. Referring to FIG. 9, the teach controls 140 for five axes are actuated so that the weld gun is moved to the desired location for the first spot weld. As described in U.S. Pat. No. 3,744,032 referred to previously, the teach controls 140 control suitable servo amplifiers and valves 142 for the five axes, these valves controlling in turn the hydraulic cylinders 144 which drive each axis. The readings of the encoders 146 associated with each of the five controlled axes are then recorded when the record button 148 is closed, these encoder signals being supplied to an 80-bit shift register and stored in memory during the teaching operation so that they may be utilized as command signals during playback. In addition to the encoder signals, a number of other auxiliary signals are recorded during the teaching operation. These signals include an accuracy selection signal which is derived from the accuracy selection switch 150, a weld initiation signal which is supplied by the switch 152, and a conveyor synchronizing signal which is supplied from the conveyor sync switch 154 during periods when the movement of the manipulator arm is to be synchronized with a moving conveyor, as described in detail in U.S. Pat. No. 3,744,032.

In accordance with the present invention a weld gun repositioning switch 156 is provided, this switch having three positions for designating either the rotary axis, the down-up axis, or the in-out axis as the proper axis for controlling the repositioning of the weld gun during playback for a particular series of welds. In addition, the switch 156 has an off position in which no auxiliary weld gun repositioning is to be performed. During the above-discussed teaching operation wherein correction is to be made in the rotary axis during playback, the operator would move the weld gun 20 to the correct location for the first spot weld and would also move the switch 156 to the "rotary" position. Accordingly, when the record button 148 is depressed, an auxiliary control signal would be transferred to memory indicating that the command signal developed for the rotary axis during playback is to be modified. If, during a succeeding series of welds, the manipulator arm should be moved in the in-out axis to accomplish weld gun repositioning, the switch 156 would be moved to the "in-out" position and a corresponding different auxiliary signal would be recorded in memory for each of the spot welds in this next series.

Figure 10:
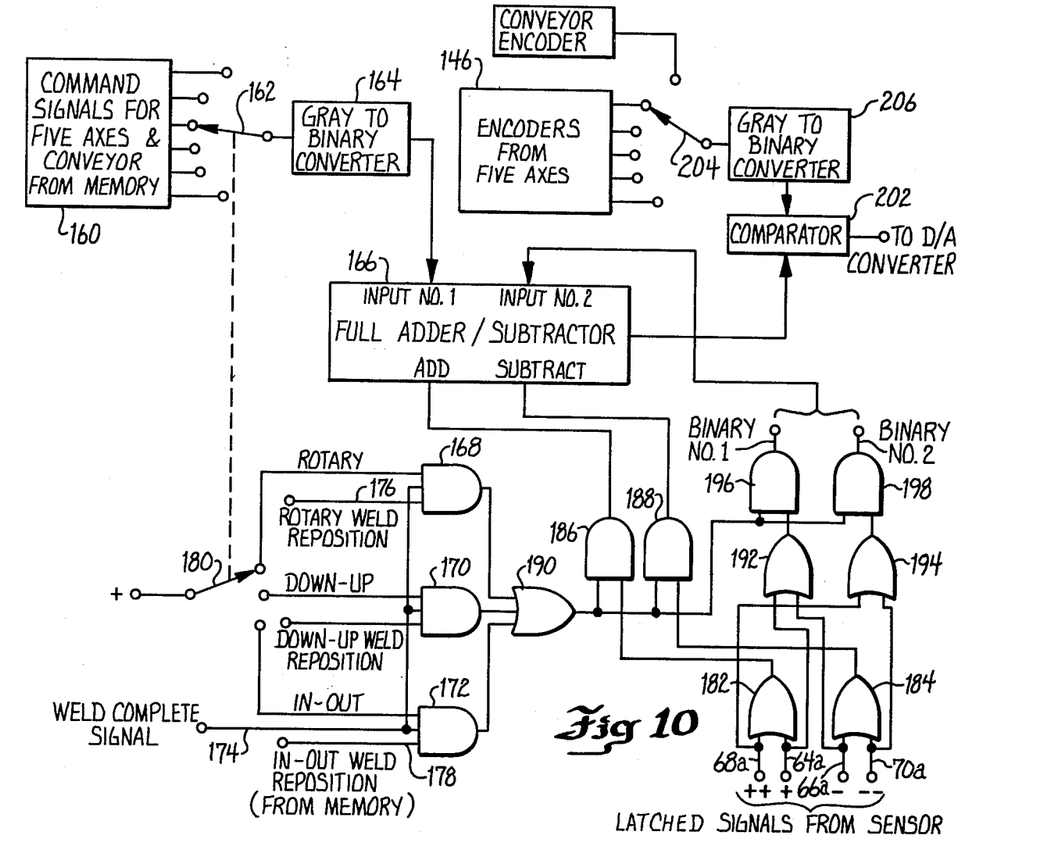
FIG. 10 is a circuit diagram showing the operation of this alternative embodiment during playback.

Referring now to FIG. 10, wherein the circuit arrangement employed during playback to reposition the weld gun in a particular axis in accordance with the taught instructions is shown, the command signals 160 which are derived from memory and correspond to desired locations in each of the five axes and the position of the conveyor, are supplied through a multiplex arrangement indicated as the switch 162 and through a gray-to-binary converter 164 to one input of a full adder—subtractor 166.

A series of AND-gates 168, 170 and 172 are provided for each of the three major axes which are to be individually controlled in accordance with a weld reposition signal derived from the memory. The weld complete signal, which is developed on the conductor 174 each time a weld has been completed and the welding jaws 32, 34 are to be opened, is supplied as one input to each of the AND-gates 168, 170 and 172. In addition, the auxiliary control signal which is recorded in memory in accordance with the position of the weld gun repositioning switch 156, is supplied as one input to the corresponding one of the AND-gates 168, 170 and 172. Thus, if weld gun repositioning is to be performed in the rotary axis, on playback a rotary axis weld reposition signal will be developed from memory and supplied over the conductor 176 to the AND-gate 168. On the other hand, if the correction for weld gun position is to be made in the in-out axis an auxiliary control signal will be supplied on playback over the conductor 178 to the AND-gate 172. The third input of the AND-gates 168, 170 and 172 is supplied by a multiplexing arrangement indicated as the rotary switch 180, this switch being operated in synchronism with the switch 162 so that the AND-gates 168, 170 and 172 are sequentially enabled in synchronism with the corresponding command signals which are supplied to input No. 1 of the full adder—subtractor 166. In most applications the weld complete signal is initiated as soon as the welding tips 32, 34 are opened and is sustained until the next weld initiate signal is developed when the welding tips are again closed to make the next spot weld.

In the embodiment of FIGS. 9 and 10, the air gage is mounted on the welding jaw 34 of the weld gun 20 in a manner similar to that described in detail heretofore in connection with the embodiment of FIGS. 1 to 8, inclusive. Also, the output of the air gage 44 is supplied over the control line 54 to the differential pressure sensors 56 so that control signals are developed on the output conductors 64, 66, 68 and 70, thereof, as described in detail heretofore. Preferably, the signals on the conductors 64–70 are stored in suitable latches, which are set in response to the weld complete signal and maintain the previously established correction until a signal of the opposite polarity appears on the conductors 64–70. Thus, if a signal appears on the conductor 64 this signal is stored when a weld complete signal appears on the conductor 74. If at the second weld complete signal the sensors 56 are developing a zero signal on the conductor 60 the stored signal is i maintained. However, if the sensors are developing a minus signal on the conductor 66 the latch which has stored the signal on the conductor 64 is reset, but the signal on the minus conductor 66 is not latched so that no modification of the original command signal is made. If a signal on the minus conductor 66 is still being developed at the third weld complete signal this signal is stored and is maintained during successive welds as long as either a minus signal appears on the conductor 66 or a zero signal appears on the conductor 60. A similar arrangement is provided in connection with the large error signals on the conductors 68 and 70. The outputs of these latches are indicated as the conductors 64a, 66a, 68a and 70a, respectively. The latched outputs which are developed on the conductors 64a and 68a and correspond to the small and large errors on the conductors 64 and 68 are supplied as two inputs to an OR-gate 182 and the latched small and large negative error signals on the conductors 66a and 70a are supplied as two inputs to an OR-gate 184. The output of the OR-gate 182 is supplied as one input to an AND-gate 186 and the output of the OR-gate 184 provides one input for an AND-gate 188. The other inputs of the AND-gates 186, 188 are supplied from the particular one of the AND-gates 168, 170 or 172 which corresponds to the particular axis in which weld gun repositioning is to be made, the outputs of these three AND-gates being supplied through a three-input OR-gate 190. The output of the AND-gate 186 is supplied to the ADD terminal of the adder—subtractor 166 and the output of the AND-gate 198 supplied to the subtract terminal thereof. Accordingly, when either a latched plus or minus error signal is developed on the output conductors 64a or 66a, which indicates that the welding tips 32, 34 are not properly positioned with respect to the edge of the flanges 24, 26, a predetermined increment is added to the command signal which is read from memory in the corresponding axis. More particularly, the outputs of the low value plus and minus error signals on the conductors 64a, 66a are supplied as two inputs to an OR-gate 192 and the large error signals on the conducrors 68a, 70a are supplied as two inputs to an OR-gate 194. The output of the OR-gate 192 is supplied as one input to an AND-gate 196 and the output of the OR-gate 194 provides one input for an AND-gate 198. The other inputs of the AND-gates 196, 198 are supplied from the output of the OR-gate 190 as an enabling signal whenever the particular axis in which correction is to be made is scanned.

Considering now the operation of the playback system of FIG. 10, when the air gage 44 develops a control signal corresponding to a relatively small magnitude error with respect to the edge of the flanges 24, 26, a latched signal on either the conductor 64a or the conductor 66a is supplied through the OR-gate 192 to the input of the AND-gate 196. When the rotary axis command signal is supplied to the input No. 1 of the adder—subtractor 166 the AND-gate 196 is also energized and supplies an input signal over the indicated binary No. 1 conductor 200 to the input No. 2 of the adder—subtractor 166. The conductor 200 may be connected to any desired input digit of the input No. 2 circuit so that a predetermined increment will be added to the rotary axis command signal during this multiplex period. The output of the adder—subtractor 166 is supplied as a modified command signal to the conventional comparator 202, the comparator 202 comparing this modified command signal with the encoder signal from the rotary axis which is supplied through the multiplexing switch 204 and the gray-to-binary converter 206 to the other input of the comparator 202. The output of the comparator is then supplied to a suitable digital-to-analog converter and is employed to move the manipulator arm 23 in the rotary axis in accordance with the modified command signal. Since the rotary axis command signal read from memory has been modified by adding a predetermined increment thereto in the adder—subtractor 166 the manipulator arm and hence the weld gun 20 is now moved to a different location than the originally taught path. Specifically the weld gun is now moved so that the weld tips 32, 34 have been moved with respect to the flange edges 24, 26, so that the next spot weld will be made closer to the desired center line along the middle of the flanges 24, 26. A similar operation is provided if a relatively large latched error signal is developed on the conductors 68a or 70a. In this event, the AND-gate 198 develops an output signal on the indicated binary No. 2 conductor 210, this conductor being connected to a higher order input of input No. 2 in the adder—subtractor 166. Accordingly, if a relatively large error signal is developed, the rotary axis command signal is modified by a larger predetermined increment so that a larger correction toward the desired midpoint of the flanges 24, 26 is made before the next spot weld is initiated.

In this connection, it should be noted that if none of the command signals for the three major axes are to be modified for weld gun repositioning, none of the AND-gate 168, 170 or 172 will be enabled and no output will be supplied to either the ADD or the SUBTRACT lines of the adder—subtractor 166. Under these conditions the adder—subtractor simply transmits the command signals supplied to input No. 1 without modification to the comparator 202. Also, if weld gun repositioning in a particular axis is indicated by an auxiliary signal of one of the conductors 176, 178, etc. but no correction of weld gun position is required by the sensors 56, no signal will be produced on the sensor output conductors 64-70 so that no signal will be supplied to input No. 2 of the adder—subtractor and again the command signals are supplied without modification to the comparator 202. It is only when misalignment of the welding tips with respect to the flange edges is indicated by the output of the air gage 44 that a correction to the corresponding command signal is made. Furthermore, this correction is made only to the particular axis which has been designated during the teaching operation as the proper axis for movement to accomplish the desired weld gun repositioning, as described in detail heretofore.

While there have been described what are at present considered to be the preferred embodiments of the invention, it will be understood that various modifications may be made therein which are within the true spirit and scope of the invention.

What is claimed as new and desired to be secured by Letters Patent of the United States is:

1. In a programmable manipulator, the combination of, a manipulator arm, means for moving said arm in a plurality of axes, means for generating command signals during a playback cycle, means controlled by said command signals for controlling said arm moving means to move said arm over a desired path relative to a workpiece, a weld gun positioned on the end of said arm and operative to perform a series of spot welds at predetermined points along said path during said playback cycle, means for sensing the relationship between said weld gun and a predetermined portion of the workpiece immediately after a spot weld is made at one of said predetermined points, and means controlled by said sensing means for modifying said path by successive predetermined increments as said arm is moved to successive ones of said predetermined points, thereby to maintain said gun in generally fixed relation to said predetermined portion of the workpiece.

2. The combination of claim 1, wherein said weld gun is movable relative to said end of said arm along a line generally perpendicular to said path.

3. The combination of claim 2, which includes means independent of said arm moving means for moving said weld gun along said line.

4. The combination of claim 2, which includes a mounting plate positioned on the end of said arm, and a cross head mounted on said mounting plate for movement along said line and having said weld gun mounted thereon.

5. The combination of claim 4, wherein said weld gun includes a pair of welding tips adapted to engage the workpiece on opposite sides thereof, sensing means carried by said weld gun and positioned in the vicinity of said welding tips for sensing the position of said welding tips relative to said predetermined portion of said workpiece, and means controlled by said sensing means for moving said crosshead along said line, thereby to maintain said welding tips in fixed relation to said predetermined portion of said workpiece.

6. The combination of claim 5, wherein said predetermined portion of the workpiece comprises a flange along which said series of spot welds is to be made, and said sensing means comprises air gage means for measuring the position of said welding tips relative to said flange.

7. The combination of claim 6, wherein said air gage means includes means for developing an electrical signal proportional to the displacement of said welding tips relative to said flange, and means controlled by said electrical signal for moving said crosshead along said line.

8. The combination of claim 7, which includes means for developing a control signal when said welding tips have completed a spot weld on said workpiece, and means controlled by said control signal for initiating control of said crosshead moving means by said electrical signal.

9. The combination of claim 4, which includes means for developing a control signal when said arm has been moved over said path relative to a given workpiece, and means responsive to said control signal for moving said crosshead to a predetermined point relative to said mounting plate in preparation for the next workpiece.

10. The combination of claim 9, which includes means for sensing the approximate midpoint of travel of said crosshead relative to said mounting plate, and means jointly responsive to said control signal and said sensing means for moving said crosshead to said midpoint.

11. The combination of claim 10, wherein said sensing means comprises a light source and photoelectric detector means for detecting said midpoint.

12. The combination of claim 5, which includes a driving motor mounted on said end of said arm, and means interconnecting the shaft of said motor and said crosshead, thereby to drive said crosshead along said line when said motor is energized.

13. The combination of claim 12, which includes means controlled by said sensing means for energizing said motor after said welding tips have completed a spot weld so that said crosshead is moved relative to said mounting plate as said arm is moved to the next spot welding point in said series.

14. The combination of claim 13, wherein said crosshead is moved a predetermined increment along said line each time said motor is energized.

15. The combination of claim 14, which includes means for de-energizing said motor when said crosshead has been moved said predetermined increment.

16. The combination of claim 5, wherein said sensing means develops an electrical signal proportional to the displacement of said welding tips from said fixed relation, means for moving said crosshead a first predetermined increment in the direction to maintain said fixed relation when said electrical signal is small, and means for moving said crosshead a second larger increment in said direction when said electrical signal is large.

17. In a programmable manipulator, the combination of, a manipulator arm, means for moving said arm in a plurality of axes, means for generating command signals during a playback cycle, means controlled by said command signals for controlling said arm moving means to move said arm over a desired path relative to a workpiece, a weld gun positioned on the end of said arm and operative to perform a series of spot welds at predetermined points along said path during said playback cycle, means for sensing the relationship between said weld gun and a predetermined portion of the workpiece after a spot weld is made at one of said predetermined points, and means controlled by said sensing means for moving said gun relative to said end of said arm by successive predetermined increments as said arm is moved to successive ones of said predetermined points.

18. The combination of claim 17, wherein said predetermined portion of the workpiece comprises a flange along which said series of spot welds is to be made, air gage means movable with said gun for determining the position of said gun relative to said flange and operative to develop a variable pressure signal, and means responsive to said variable pressure signal for controlling said gun moving means.

19. The combination of claim 18, which includes pressure sensing means responsive to said variable pressure signal and operative to develop first and second control signals when said gun is displaced in opposite directions from said fixed relation, and means for controlling said gun moving means in accordance with said first and second control signals.

20. In a programmable manipulator, the combination of, a manipulator arm, a weld gun mounted on the end of said arm for movement relative to said end of said arm, program control means operative during a playback cycle to move said arm over a desired path relative to a workpiece and controlling said weld gun to make a series of spot welds on said workpiece at predetermined points along said path, means for sensing the relationship between said weld gun and a predetermined portion of said workpiece after a spot weld is made at one of said predetermined points, and weld gun repositioning means controlled by said sensing means and operative during movement of said arm between said predetermined points for moving said weld gun relative to said end of said arm in successive predetermined increments so that said weld gun maintains a predetermined relationship with respect to said predetermined portion of said workpiece as said spot welds are made on said workpiece.

21. In a programmable manipulator, the combination of, a manipulator arm, programmable control means for moving said arm in a plurality of axes; means for initially programming said control means to move said arm to a series of points relative to a workpiece at which points a series of operations are to be performed on the workpiece, a work device carried on the end of said arm and arranged to perform a workpiece operation after said arm has been moved to each of said points, air gage means for sensing the position of said work device relative to a predetermined portion of the workpiece after an operation has been performed thereon by said work device, means for developing an electrical control signal corresponding to the output of said air gage sensing means, and means controlled by said control signal for changing the position of said work device at successive ones of said points so as to maintain a predetermined relationship between said work device and said predetermined portion of the workpiece at said series of points.

22. The combination of claim 21, wherein said work device is a weld gun, and means for controlling said weld gun to make a spot weld on the workpiece after said arm has been moved to each of said points.

23. The combination of claim 22, wherein said predetermined portion of the workpiece comprises a flange along which a series of spot welds are to be made by said weld gun.

24. The combination of claim 23, which includes means for moving said weld gun relative to said end of said arm in a direction generally perpendicular to said flange to maintain said fixed relation between a weld gun and said flange.

25. In a programmable manipulator, the combination of, a manipulator arm movable in a plurality of axes, programmed control means for moving said arm over a predetermined path relative to a workpiece, a work device carried on the end of said arm and arranged to perform a workpiece operation at each of a series of points along said path, means for sensing the position of said work device relative to a predetermined portion of the workpiece after a workpiece operation has been performed on the workpiece by said work device, and means controlled by said sensing means for moving said work device by predetermined increments between said workpiece operations and in a direction generally perpendicular to said path, thereby to correct for variations in the location of said predetermined portion of the workpiece relative to said programmed series of points from one workpiece to another.

26. The combination of claim 25, which includes means for developing a series of command signals, means controlled by said command signals for moving said arm along said path, and means controlled by said sensing means for modifying said command signals to correct for variations in the location of said predetermined portion of the workpiece relative to said programmed series of points from one workpiece to another.

27. The combination of claim 26, wherein said work device is a weld gun, and means for controlling said weld gun to make a weld on the workpiece after said arm has been moved to each of said points.

28. The combination of claim 27, wherein said predetermined portion of the workpiece comprises a flange along which a series of spot welds are to be made by said weld gun.

29. The combination of claim 26, wherein said command signals are modified by said predetermined increments after a workpiece operation has been completed.

30. In a programmable manipulator, the combination of, a manipulator arm movable in a plurality of axes, means for moving said arm over a predetermined path relative to a workpiece during an initial teaching operation, means for generating and storing command signals corresponding to the position of said arm in each of said axes at a series of points along said path, means for generating and storing auxiliary control signals in association with said command signals to designate one or more of said axes for corrective movement during a playback cycle, a work device carried on the end of said arm during a playback cycle and arranged to perform a workpiece operation at each of said points along said path, means controlled by said command signal for sequentially moving said arm to said series of points during said playback cycle, means for sensing the position of said work device relative to a predetermined portion of the workpiece during said playback cycle, and means jointly controlled by said auxiliary control signals and said sensing means for modifying said command signals, thereby to maintain a generally fixed relationship between said work device and said predetermined portion of the workpiece as said workpiece operations are performed.

31. The combination of claim 30, wherein said command signal modifying means is effective to move said work device in a direction generally perpendicular to said path to maintain said fixed relationship.

32. The combination of claim 30, wherein said command signal modifying means is effective to modify only those command signals corresponding to axes designated by said auxiliary control signals.

33. The combination of claim 32 wherein said command signaal modifying means changes said designated command signals by a predetermined increment after a workpiece operation has been completed by said work device.

* * * * *